United States Patent [19]
Yoshizaki

[11] 3,906,724
[45] Sept. 23, 1975

[54] AIR CLEANER ASSEMBLY FOR AN INTERNAL COMBUSTION ENGINE HAVING AN EXHAUST GAS PURIFICATION SYSTEM

[75] Inventor: Masaaki Yoshizaki, Toyota, Japan

[73] Assignee: Toyota Jidosha Kogyo Kabushiki Kaisha, Japan

[22] Filed: July 11, 1974

[21] Appl. No.: 487,735

[30] Foreign Application Priority Data
Dec. 3, 1973    Japan........................ 48-137821[U]

[52] U.S. Cl. .................... 60/305; 55/484; 55/502; 55/510; 55/DIG. 28; 55/483; 60/307
[51] Int. Cl.² ............................................. F01N 3/10
[58] Field of Search ............. 55/482, 483, 484, 498, 55/510, 511, DIG. 28, 502, 495, 497, DIG. 21, 276; 123/119 D, 119 B; 60/297, 305, 307, 311, 290, 304

[56] References Cited
UNITED STATES PATENTS
| | | | |
|---|---|---|---|
| 3,277,876 | 10/1966 | Abts.................................... | 55/502 |
| 3,385,038 | 5/1968 | Davis................................... | 55/484 |
| 3,491,533 | 1/1970 | Schrag................................. | 60/305 |
| 3,589,108 | 6/1971 | Dingel et al. ......................... | 55/482 |
| 3,672,172 | 6/1972 | Hammond ......................... | 60/307 X |
| 3,774,399 | 11/1973 | Nohira et al...................... | 60/307 X |

*Primary Examiner*—Frank W. Lutter
*Assistant Examiner*—David L. Lacey
*Attorney, Agent, or Firm*—Toren, McGeady and Stanger

[57] ABSTRACT

An air cleaner assembly is provided for an internal combustion engine having an exhaust gas purification system. A casing of the assembly has its interior divided into an atmospheric air section and a clean air section with filter means interposed therebetween. The clean air section is divided into a first compartment communicating with a carburetor of the engine and a second compartment communicating with the exhaust gas purifier.

7 Claims, 6 Drawing Figures

AIR CLEANER ASSEMBLY FOR AN INTERNAL COMBUSTION ENGINE HAVING AN EXHAUST GAS PURIFICATION SYSTEM

BACKGROUND OF THE INVENTION

The present invention relates to air cleaners for internal combustion engines, and particularly to an assembly for supplying clean air to both the exhaust gas purifier and the carburetor of the engine.

Where air is supplied to the carburetor and to the exhaust gas purifier of an engine, air to be supplied must be filtered through an air cleaner in order to meet the exigencies of engine performance and service life of the air pump used for the exhaust gas purifier. Where a single air cleaner is used to supply air to both the carburetor and the exhaust gas purifier, the ratio between the quantity of filtered air withdrawn into the air pump of the exhaust gas purifier and the quantity withdrawn into the carburetor is not always constant, so that the pressure in the air cleaner changes with respect to the case when air is supplied only to the carburetor. Since the air cleaner communicates with the venturi section of the carburetor, the changing pressure in the air cleaner directly affects the pressure in the venturi section, thus adversely affecting the air-fuel ratio of the air-fuel mixture supplied to the engine proper. In such a case, even though the carburetor is adjusted to provide proper air-fuel ratio, desired engine performance will not be obtained and harmful components in the exhaust gas will be increased.

Also, if blow-by gas from a blow-by gas recirculating means provided in the internal combustion engine is recirculated into the air cleaner, oil mist will also be drawn into the air pump of the exhaust gas purifier, so that the durability of the air pump would be reduced.

To solve the above mentioned problems it has been proposed to provide two separate air cleaners, one for supplying clean air to the carburetor and the other for supplying clean air to the exhaust gas purifier. However, inclusion of two separate air cleaners in an automobile will produce space problems within the vehicle compartment where the air cleaners are to be located.

The invention, accordingly, is intended to enable clean air to be supplied from a single air cleaner to both the carburetor and the exhaust gas purifier without adversely affecting the air-fuel ratio of the air-fuel mixture provided from the carburetor, and an object of the invention is to provide a unitarily structured air cleaner assembly for internal combustion engine which is capable of supplying clean air to both the carburetor and the exhaust gas purification system of the engine.

SUMMARY OF THE INVENTION

Briefly, the present invention may be described as an air cleaner assembly for providing filtered air to both a carburetor and an exhaust gas purification system of an internal combustion engine, said assembly comprising, a casing, means defining an air inlet to said casing, filter means located within the casing, means separating the interior of the casing into an atmospheric air section communicating with the air inlet means and a clean air section, with the atmospheric air section being sealed from the clean air section so that all air entering the atmospheric air section will be directed through the filter means into the clean air section. The clean air section is divided into a first compartment and a second compartment by partition means which are located interiorly of the casing and first duct means communicate the first compartment of the clean air section with the carburetor while second duct means communicate the second compartment with the exhaust gas purification system of the engine.

The casing may be formed in a generally cylindrical configuration having a pair of end walls and a circumferential side wall extending between the end walls, and the filter means may be formed in a generally annular configuration having an inner peripheral side and an outer peripheral side. The outer peripheral side of the filter means is spaced from the side wall of the casing to define the atmospheric air section therebetween and the clean air section is located within the boundaries of the inner peripheral side of the filter means.

In accordance with various aspects of the present invention, the partition means and the duct means may be arranged in various configurations to define the first and second compartments of the clean air section and to enable communication of each compartment, respectively, with the carburetor and with the exhaust gas purification system.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
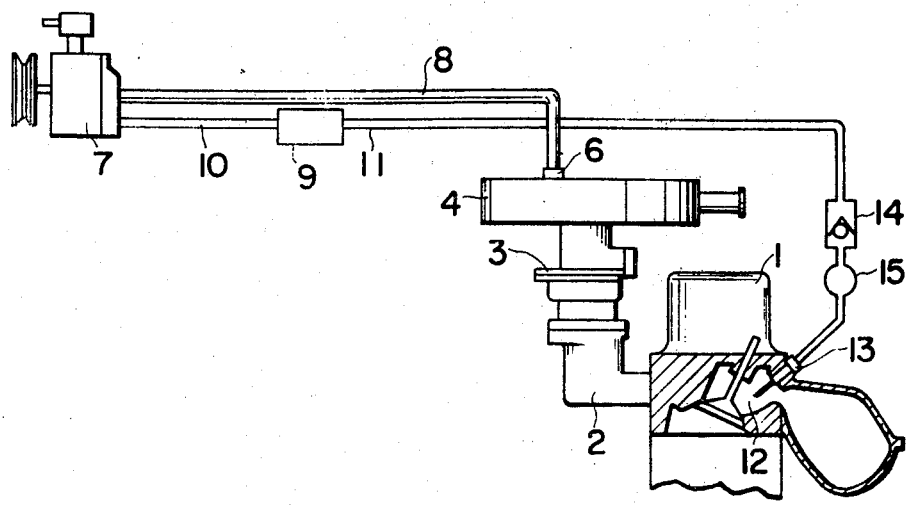
FIG. 1 is a schematic representation of an internal combustion engine having an exhaust gas purifier and provided with an air cleaner according to the invention.
Figure 2:
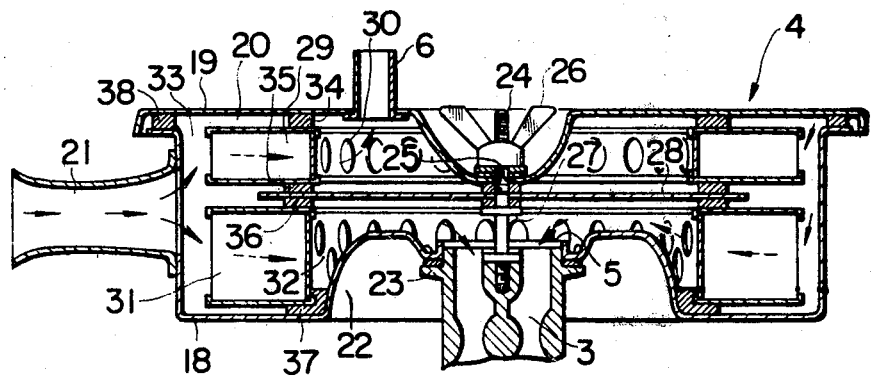
FIG. 2 is a side sectional view of an air cleaner embodying the invention.

Referring now to the drawings, wherein like reference characters refer to similar parts throughout the various figures thereof, FIGS. 1 and 2 show one embodiment of the air cleaner of the present invention utilized with an internal combustion engine having an exhaust gas purifier. An engine body 1 is provided with an intake manifold 2 connected through a carburetor 3 to an outlet port 5 of an air cleaner 4. Clean air is thus supplied from the air cleaner 4 to the carburetor 3, from which an air-fuel mixture is supplied through the intake manifold 2 to the engine body 1. The air cleaner 4 is also provided at the top of its clean air section with another air outlet 6, which is connected through a duct 8 to the inlet of an air pump 7. The outlet of the air pump 7 is connected through a duct 10, control means 9, a duct 11, a non-return valve 14 and an air injection manifold 15 to air injection nozzles 13 provided at exhaust ports 12 located in the engine body 1, whereby secondary air is supplied from the air injection nozzles 13 to the exhaust ports 12 for combusting the non-combusted components in the exhaust gas.

The air cleaner 4 has a cylindrical chamber 20 defined by an air cleaner case 18 and an air cleaner cap 19. The peripheral wall of the air cleaner case 18 is provided with an atmospheric air intake tube 21 communicating with the cylindrical chamber 20. The air cleaner case 18 has a central cylindrical depression 22 provided at the center thereof with the aforesaid outlet port 5 being supported on a flange 23 formed at the inlet of the carburetor 3.

Threaded into a central top wall portion of the carburetor 3 is one threaded end portion of a support stud member 24, which penetrates the outlet port 5 of the air cleaner case 18 and a hole formed at the center of the air cleaner cap 19. The air cleaner cap 19 is placed on the air cleaner case 18 and is secured thereto by fastening a thumb nut 26 fitted on the other threaded end portion of the support stud member 24. The support stud member 24 is provided at its intermediate portion with a support means 27, on which is supported a disc-like partition wall 28 whose circumference is spaced from the inner peripheral wall of the air cleaner case 18.

Interposed between the circumferential portion of the partition wall 28 and the air cleaner cap 19 is an annular filter member 29, and a clean air compartment 30 communicating with the outlet 6 is defined by the inner periphery of the filter member 29, air cleaner cap 19 and partition wall 28. Another annular filter member 31 is interposed between the circumferential portion of the partition wall 28 and the air cleaner case 18, and another clean air compartment 32 communicating with the outlet port 5 is defined by the inner periphery of the filter member 31, air cleaner case 18 and partition wall 28.

Further, an annular atmospheric air section 33 is defined by the inner peripheral wall of the air cleaner case 18 and the outer periphery of the filter members 29 and 31. Separating means in the form of annular seal members 34 and 35 are provided respectively between filter member 29 and air cleaner cap 19 and between filter member 29 and partition wall 28. Also, annular seal members 36 and 37 respectively are provided between filter member 31 and partition wall 28 and filter member 31 and air cleaner case 18. Thus, the separating means seal the clean air section from the atmospheric air section and also prevent vibrations of the partition wall.

A further annular seal member 38 is also provided between air cleaner case 18 and air cleaner cap 19.

While in this embodiment of the air cleaner the air outlet port 6 communicating with the air pump 7 is directly provided in the air cleaner cap 19, where problems are encountered in installing such an air cleaner on an automobile, an outlet port may be provided in the partition wall 28 and connected through a duct penetrating the clean air compartment 32 and the bottom wall of the air cleaner case 18 to the duct 8 communicating with the air pump 7.

In the operation of an air cleaner 4 constructed in accordance with the present invention, air entering through the atmospheric air intake tube 21 into the atmospheric air section 33 is filtered through the filter members 29 and 31 before entering the clean air compartments 30 and 32. The air flowing into the clean air compartment 32 is supplied through the outlet port 5 to the carburetor 3 where it is combined with fuel to produce an air-fuel mixture supplied through the intake manifold 2 to the engine body 1. Meanwhile, the air flowing into the clean air compartment 30 is withdrawn by the air pump 7 through the air outlet 6 and duct 8, and the air withdrawn flows through the duct 10 into the control means 9. The air entering the control means 9 goes through the duct 11 into the air injection nozzles 13, where it is injected into the exhaust ports 12 for combusting the non-combusted components in the exhaust gas. In this arrangement, since the partition wall 28 separates the clean air compartment 30 defined by the filter member 29 and the clean air compartment 32 defined by the filter member 31, the pressure in the clean air compartment 32 is not affected by changes in the pressure in the clean air compartment 30, so that a constant air-fuel ratio in the carburetor can be maintained.

Figure 3:
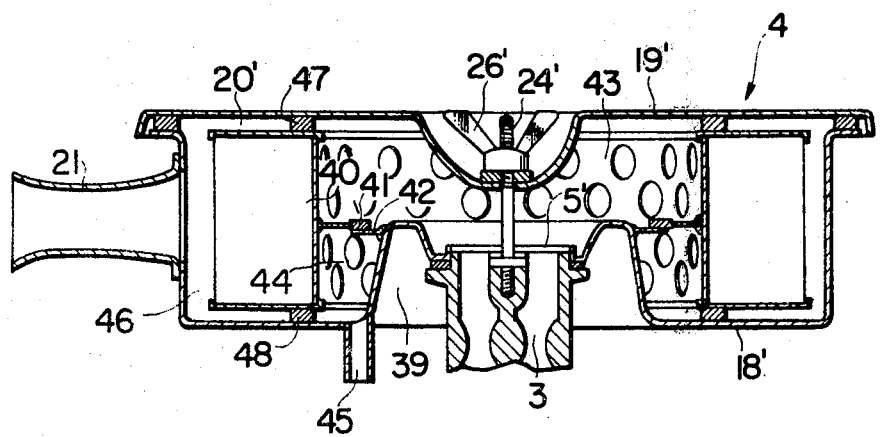
FIG. 3 is a side sectional view of a second embodiment of the air cleaner according to the invention.

FIG. 3 shows a second embodiment of the invention. The air cleaner 4 shown here has a cylindrical chamber 20' defined by an air cleaner case 18' having the peripheral wall provided with an atmospheric air intake tube 21 and an air cleaner cap 19'. The air cleaner case 18' has a central cylindrical depression 39 provided at the center thereof with an outlet port 5' communicating with the carburetor 3. Here, an annular filter member 40 is provided between and spaced from the inner peripheral wall of the air cleaner case 18' and central depression 39 thereof. The inner wall of the filter member 40 is provided at its axially central portion with an annular seal 41 in sealing engagement with a flange 42 extending from the top of the cylindrical depression 39. In this way, a clean air compartment 43 communicating with the carburetor 3 is defined by the air cleaner cap 19', seal 41 and the inner periphery of the filter member 40, and another clean air compartment 44 is defined by the air cleaner case 18', cylindrical depression 39, seal 41 and the inner periphery of the filter member 40. The bottom of the air cleaner case 18' is provided with an outlet 45 communicating with the clean air compartment 44. The outlet 45 is connected through the duct 8 to the air pump 7. An annular atmospheric air section is formed between the inner peripheral wall of the air cleaner case 18' and the outer periphery of the filter member 40. Annular seals 47 and 48 are provided, respectively, between filter member 40 and air cleaner cap 19' and between filter member 40 and the air cleaner case 18'. The air cleaner cap 19' is secured by means of a support stud member 24' having no intermediate support means and by a thumb nut 26'.

With the air cleaner of this construction, atmospheric air entering through the atmospheric air intake tube 21 into the atmospheric air section 46 is filtered through the filter member 40, and the filtered air enters the clean air compartments 43 and 44. The clean air entering the clean air compartment 43 flows through the outlet port 5' to the carburetor 3, while the air entering the clean air compartment 44 flows through the outlet 45 and duct 8 to the air pump 7 and is used for purification of the exhaust gas.

Figure 4:
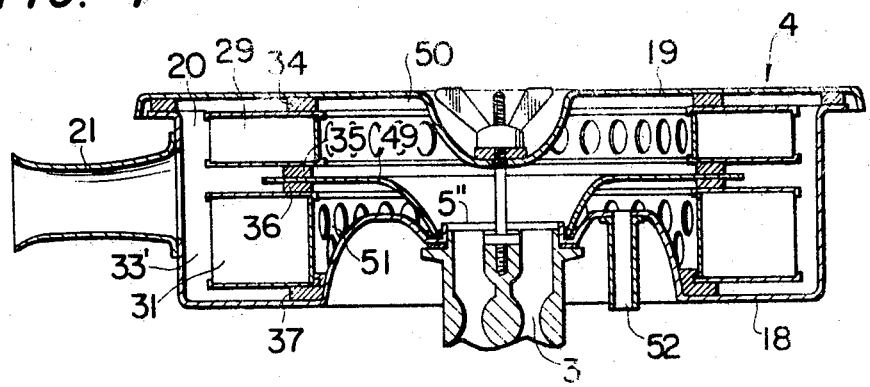
FIG. 4 is a side sectional view of a third embodiment of the air cleaner according to the invention.

FIG. 4 shows a third embodiment of the invention wherein the air cleaner has a cylindrical chamber 20 defined by air cleaner case 18 having an atmospheric air intake tube 21 and air cleaner cap 19. Here, a partition member 49 having a funnel-shaped central projection formed with a central outlet port 5" is provided. This open end of the projection is supported on the support flange portion of the carburetor 3 also supporting the air cleaner case 18. The circumference of the partition member 49 is spaced from the inner peripheral wall of the air cleaner case 18. As in the first embodiment, annular filter members 29 and 31 are provided between the top wall of the air cleaner cap 18 and the bottom of the air cleaner case 19 on opposite sides of the partition member 49 with annular seal members 34 and 35 being provided for the filter member 29 and annular seal members 36 and 37 being provided for the filter member 31 in the manner mentioned above in connection with the first embodiment.

Thus, a clean air compartment 50 is defined by the air cleaner cap 19, partition member 49 and inner periphery of the filter member 29, and another clean air compartment 51 is defined by the partition member 49, air cleaner case 18 and inner periphery of the filter member 31. The bottom of the air cleaner case 18 is provided with an outlet port 52 communicating with the air cleaner compartment 51, and this outlet port 52 is connected through the duct 8 to the air pump 7. Also, an atmospheric air section 33' is defined between the inner peripheral wall of the air cleaner case 18 and the outer periphery of the filter members 29 and 31.

With an air cleaner of this construction, atmospheric air entering through the atmospheric air intake tube 21 into the atmospheric air section 33' is filtered through the filter members 29 and 31, and air filtered through the filter members 29 and 31 enters the respective clean air compartments 50 and 51. The air entering the clean air compartment 50 flows through the outlet port 5" into the carburetor 3, while the air entering the clean air compartment 51 is led through the outlet tube 52 and duct 8 to the air pump 7 and is used for the purification of the exhaust gas.

Figure 5:
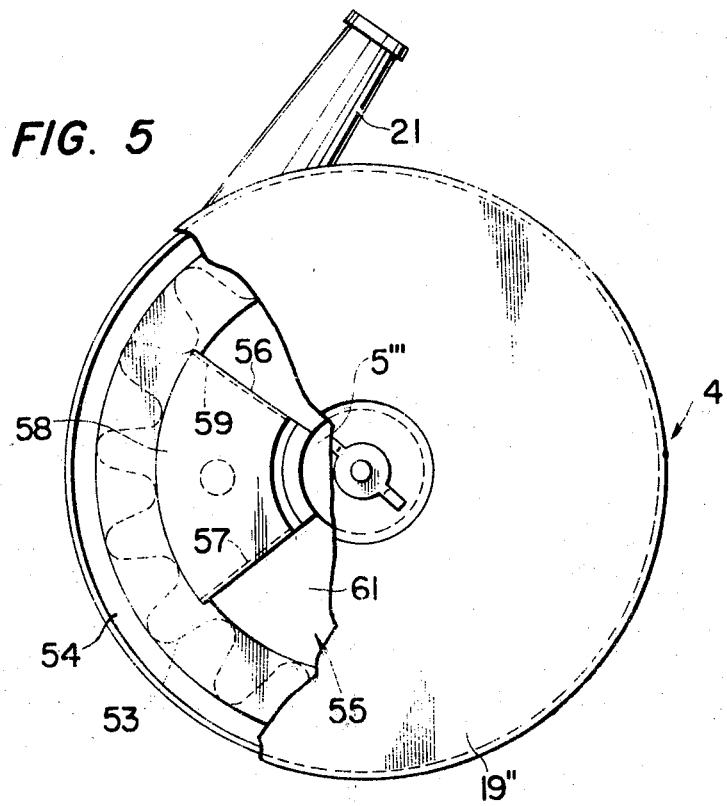
FIG. 5 is a plane view, partly broken away, showing a fourth embodiment of the air cleaner according to the invention.
Figure 6:
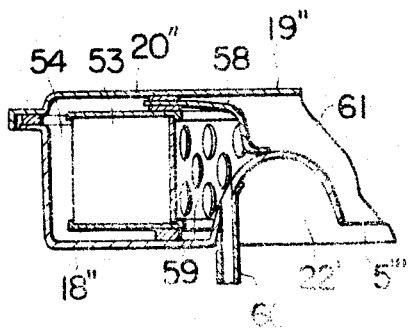
FIG. 6 is a fragmentary side sectional view showing part of the embodiment of FIG. 5.

FIGS. 5 and 6 show a fourth embodiment of the invention wherein the air cleaner assembly includes a cylindrical chamber 20" defined by an air cleaner case 18" provided with an atmospheric air intake tube 21 and an air cleaner cap 19". Here, an annular filter member 53 is provided in the cylindrical chamber 20" to define an annular atmospheric air section 54 between the outer periphery of the filter member 53 and inner peripheral wall of the air cleaner case 18" and a clean air section 55 within the inner periphery of the filter member 53. Within the clean air section 55, there is disposed a sector-shaped partition member consisting of radially spaced side walls 56 and 57 and a top wall 58 connecting the side walls 56 and 57. In this way, a compartment 59 in the shape of a sector is defined by the inner periphery of the filter member 53, side walls 56 and 57 and top wall 58 of the sector-shaped partition member, the bottom of the air cleaner case 18" and the peripheral wall portion of a cylindrical depression 22' formed in the lower face of the case 18". An outlet tube 60 communicating with the compartment 59 is provided in the peripheral wall portion of the cylindrical depression 22' of the air cleaner case 18", with the outlet tube 60 connected through the duct 8 to the air pump 7.

Another compartment 61 is constituted as part of the clean air section 55 other than the compartment 59, with the compartment 61 communicating with the carburetor 3 through an outlet port 5''' in the central bottom portion of the air cleaner case 18".

With the air cleaner of this construction, atmospheric air entering through the atmospheric air intake tube 21 into the atmospheric section 54 is filtered through the filter member 53, and the filtered air enters the compartments 59 and 61. The air entering the compartment 61 flows through the outlet port 5''' into the carburetor 3, while the air entering the compartment 59 is led through the outlet tube 60 and duct 8 to the air pump 7 and is used for the purification of the exhaust gas.

In the above described four embodiments, the filtering area of the filter member for the clean air compartment communicating with the carburetor is generally greater than the filtering area of the filter member for the clean air compartment connected to the air pump for the exhaust gas purifier, and the ratio between these areas is determined in accordance with the required quantity of air to be supplied to the exhaust gas purifier and the size of the engine, i.e., the quantity of the displacement.

In view of the foregoing, and since according to the invention the clean air section communicating with the carburetor and the clean air section communicating with the exhaust gas purifying means are formed within an air cleaner comprising a unitary structure, less space is required for installation on the automobile. Also, since the two clean air sections are separated by the partition member and by the filter member or members, the pressure in the clean air section communicating with the exhaust gas purifier has no effect upon the pressure in the clean air section communicating with the carburetor. Thus, the air-fuel ratio of the air-fuel mixture supplied from the carburetor will suffer no adverse effect of pressure changes in the clean air section for the exhaust gas purifier and will be maintained constant while permitting satisfactory purification of the exhaust gas to be achieved. Further, where blow-by gas is recirculated into the air cleaner, an arrangement wherein the gas enters only the clean air section communicating with the carburetor will prevent the exhaust gas purifier from experiencing the adverse effects caused by oil mist.

While specific embodiments of the invention have been shown and described in detail to illustrate the application of the inventive principles, it will be understood that the invention may be embodied otherwise without departing from such principles.

What is claimed is:

1. An air cleaner assembly for providing filtered air to both a carburetor and an exhaust gas purification system of an internal combustion engine, said assembly comprising a casing, means defining an air inlet to said casing, filter means located within said casing, seal means including said filter means separating the interior of said casing into an atmospheric air section communicating with said air inlet means and a clean air section, said atmospheric air section being sealed from said clean air section to direct all air entering said atmospheric air section through said filter means into said clean air section, partition means dividing said clean air section into a first compartment and a second compartment in an arrangement wherein said first and second compartments are sealed and separated from each other and from said atmospheric air section by said filter means, said partition means and said seal means, first duct means communicating said first compartment with said carburetor, and second duct means communicating said second compartment with said exhaust gas purification system.

2. An assembly according to claim 1 wherein said casing is formed with a generally cylindrical configuration having a pair of end walls and a circumferential side wall extending between said end walls, wherein said filter means are formed with a generally annular configuration having an inner peripheral side and an outer peripheral side, said outer peripheral side being spaced from said side wall of said casing to define therebetween said atmospheric air section, wherein said seal means are located to seal the outer peripheral side of said filter means from said inner peripheral side thereby to define said clean air section within a space bounded by said inner peripheral side, and wherein said partition means are located within the space bounded by said inner peripheral side to separate said space into said first and said second compartments.

3. An assembly according to claim 2 wherein said filter means comprise a pair of annular members located in a generally concentric relationship within said casing, and wherein said partition means comprise a substantially flat generally circular plate member interposed between said annular members.

4. An assembly according to claim 3 wherein said first duct means are located centrally of said casing to extend from one of said end walls and wherein said second duct means are located acentrically of said casing to extend from the other of said end walls.

5. An assembly according to claim 2 wherein one of said end walls of said casing is formed with a centrally located indented portion extending into said space bounded by said inner peripheral wall of said filter means, wherein said first duct means is located centrally of said one end wall with said indented portion extending thereabout, wherein said partition means are located to extend interiorly of said casing from said inner peripheral wall of said filter means to said indented portion, and wherein said second duct means are located acentrically of said one wall to extend therefrom on the side of said partition means opposite said first duct means.

6. An assembly according to claim 2 wherein said filter means comprise a pair of annular members located in a generally concentric relationship within said casing, wherein said partition means comprise a generally funnel-shaped plate member having an outer peripheral edge section and an opening defined centrally thereof by an inner peripheral edge of said plate, wherein said first duct means comprise a generally tubular member extending from one of said end walls centrally thereof, said one end wall having an inner peripheral edge defining a central opening therein with said tubular member being sealed along said inner peripheral edge of said one wall, and wherein said partition means are located to have said inner peripheral edge thereof sealed to said tubular member in a manner extending contiguously with said inner peripheral edge of said one end wall and said outer peripheral edge section sealed between said filter means annular members, said second duct means being located to extend from said one end wall at a point thereon located between said inner peripheral edge thereof which is sealed to said first duct means and said inner peripheral side of said filter means.

7. An assembly according to claim 2 wherein said first duct means are centrally located to extend from one of said end walls of said casing in flow communication with said first compartment of said clean air section, and wherein said partition means comprise at least a pair of radially directed walls separating said clean air section into a pair of sector-shaped compartments constituting said first and second clean air compartments each having one side thereof defined by a portion of said inner peripheral side of said filter means, with said second duct means being acentrically located on said one end wall to extend in flow communication with said second compartment.

* * * * *